Patented Mar. 12, 1940

2,192,931

UNITED STATES PATENT OFFICE 2,192,931

POLYMERS FROM ETHYLENE AND ACETYLENE

John Greves Paton and Edmond George Williams, Northwich, England, assignors to Imperial Chemical Industries Limited, a corporation of Great Britain No Drawing. Application October 22, 1937, Serial No. 170,446. In Great Britain October 28, 1936

4 Claims. (Cl. 260—92)

This invention relates to new compositions of matter and more particularly to valuable polymerised products.

This invention has as an object the manufacture of new and useful polymerised hydrocarbons. A further object is the production of polymerised products from mixtures of ethylene and acetylene which have unusual and valuable properties. Still other objects reside in methods for making our new polymeric material. Other objects will appear hereinafter.

These objects are accomplished by subjecting a mixture of ethylene and acetylene to high pressure at elevated temperature as will more fully appear in the following description.

By high pressure is meant a pressure of 500 atmospheres or more. Since the temperatures, pressures, and operating conditions generally used in the manufacture of our new polymerised products substantially follow the methods described for making the new solid and semi-solid polymers from ethylene in Patent 2,153,553, and in application Serial Number 157,810 filed August 6, 1937, by us jointly with M. W. Perrin, reference may be advantageously made to the processes described in said applications for a complete understanding of the present invention.

The reaction conditions for producing the above mentioned ethylene polymers comprise the use of pressures of at least 500 atmospheres and preferably at least 1000 atmospheres; the use of moderately elevated temperatures between about 100° and about 400° C., and preferably between about 150° and about 250° C.; careful control of the thermal conditions during the polymerization, in the sense that the heat of reaction must be rapidly dissipated to avoid an undue rise in temperature. In the absence of oxygen the reaction is a relatively slow one proceeding smoothly over a number of hours, at the end of which time a large proportion (up to 90%) of the ethylene has been converted.

However, if in accordance with the procedure described in said application Serial Number 157,810 small but definite amounts of oxygen, usually from 0.01% to 5%, are included with the ethylene, the reaction is very rapid, manifesting itself by a sudden pressure rise on the gauge, followed by a slow pressure drop. During this rapid reaction from about 5% to about 20% of the ethylene is polymerized, the particular yield of polymer being dependent upon the oxygen content of the ethylene. The amount of oxygen required to initiate this rapid polymerization reaction is generally dependent upon the temperature and pressure conditions employed. Since the oxygen present in the ethylene appears to be consumed during this rapid or "kick" reaction, it is necessary to add more oxygen to the ethylene if a further rapid polymerization is to be effected. If this is not desired, however, the polymerization may be allowed to continue slowly after the initial "kick" reaction. If the oxygen content of the ethylene is very low the requirement for the rapid removal of the heat of reaction is less important than when (within the allowable range) the oxygen content is relatively high, but the yield of polymer is lower in the former than in the latter case. Generally, however, the more efficient the removal of the heat of reaction the higher the tolerable oxygen content of the ethylene.

Now we have found that if, instead of ethylene as in the above mentioned processes, a mixture of ethylene and acetylene is subjected to the conditions of high temperature and pressure described above, with or without the use of small amounts of added oxygen, polymerisation products of high molecular weight are obtained which differ markedly from the ethylene polymers of the above mentioned applications.

The following example is illustrative of the methods used in practicing our invention:

Example

A mixture comprising ethylene with about 20% of acetylene, also containing a small amount, about 0.05%, of oxygen, is compressed to 1500 atmospheres, then heated to 230° C. for 12 hours. About 25% by weight of the initial mixture is converted into a yellow oil of remarkably good drying properties, thus, when dissolved in a volatile solvent and spread on a surface, a film is formed (after removal of the solvent) which dries to a tack-free condition in about 1 hour. The drying time can be reduced still further, e. g. to about 30 minutes, by the incorporation of a suitable drying catalyst, e. g. cobalt oleate.

At somewhat higher temperatures, e. g. 270–280° C., a higher yield of a similar yellow oil is obtained.

When the proportion of acetylene is small, the product is a solid, but with increasing proportions of acetylene in the initial mixture, the molecular weight of the product, for a given set of operating conditions, falls and the product is more liquid. With substantial proportions of acetylene, such as about 15% or more, the product is, as in the above example, an oil characterized by remarkable drying properties.

Unlike the reaction with ethylene alone, there is apparently no "kick" or very rapid reaction with oxygen-containing mixtures of ethylene and acetylene, although the presence of oxygen appears to favour the conversion. With mixtures of 20 per cent acetylene and 80 per cent ethylene, we have used up to 0.25 per cent of oxygen up to 240° C., without explosion if the mixture is adequately stirred.

Our new products are also compatible with other drying oils such as linseed oil stand oil and may be mixed with such drying oils to accelerate their drying.

As many apparently widely different embodiments of this invention may be made without departing from the spirit and scope thereof, it is to be understood that we do not limit ourselves to the specific embodiments thereof except as defined in the appended claims.

We claim:

1. A process for producing polymers which comprises subjecting a mixture of ethylene and acetylene which contains at least 15% acetylene to a pressure above about 500 atmospheres and a temperature above about 100° C.

2. A process for producing polymers which comprises subjecting a mixture of ethylene and acetylene which contains at least 15% acetylene and which contains a small amount of oxygen to a pressure above about 500 atmospheres and a temperature above about 100° C.

3. A process for producing polymers which comprises subjecting a mixture of ethylene and acetylene which contains at least 15% acetylene to a pressure above about 1000 atmospheres and a temperature above about 100° C.

4. A process which comprises heating at approximately 230° C. a mixture of ethylene containing about 20% acetylene and about 0.05% oxygen under a pressure of about 1500 atmospheres until a substantial proportion of said mixture is converted into a drying oil.

JOHN GREVES PATON.
EDMOND GEORGE WILLIAMS.